(12) United States Patent
Canni et al.

(10) Patent No.: US 6,450,571 B1
(45) Date of Patent: Sep. 17, 2002

(54) SEAT BACK HAVING POCKET FOR STORING A STORAGE CASE

(75) Inventors: Adam J. Canni, Auburn Hills, MI (US); Jason P. Baldas, Warren, MI (US); David B. Houston, Detroit, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/512,181

(22) Filed: Feb. 24, 2000

(Under 37 CFR 1.47)

Related U.S. Application Data

(60) Provisional application No. 60/121,991, filed on Feb. 27, 1999.

(51) Int. Cl.[7] .................................................. B60N 2/64
(52) U.S. Cl. .................................................. 297/188.04
(58) Field of Search ....................... 297/188.01, 188.04, 297/188.06, 188.07, 188.14

(56) References Cited

U.S. PATENT DOCUMENTS

| 2,126,331 | A | * | 8/1938 | Humphrey | ............. | 297/188.04 |
|---|---|---|---|---|---|---|
| 2,759,529 | A | * | 8/1956 | Hagadorn | ............. | 297/188.07 |
| 3,594,039 | A | * | 7/1971 | Harp | ................... | 297/188.07 |
| 3,690,446 | A | | 9/1972 | Spainhour et al. | | |
| 3,817,574 | A | * | 6/1974 | McNab | .................. | 297/188.04 |
| 4,807,929 | A | * | 2/1989 | Balsbaugh | ............. | 297/188.04 |
| 5,383,727 | A | | 1/1995 | Rife | | |
| 5,411,192 | A | | 5/1995 | Xiao | | |
| 5,660,310 | A | | 8/1997 | LeGrow | | |
| 5,913,553 | A | | 6/1999 | Lucas, Jr. et al. | | |
| 5,984,347 | A | | 11/1999 | Blanc-Rosset | | |
| 6,027,164 | A | * | 2/2000 | Jakubiec et al. | ....... | 297/188.07 |

* cited by examiner

Primary Examiner—Peter R. Brown
(74) Attorney, Agent, or Firm—Brooks & Kushman P.C.

(57) ABSTRACT

A modular seat back storage system for storing a case in conjunction with a vehicle seat. The case is received in a rigid pocket secured within a recess formed between the seat back shell and foam bun of the vehicle seat. The case may alternatively be received in a rigid pocket that is mounted to the rear facing surface of the seat back shell. The case may be used to store a wide variety of objects and may function as a diaper bag, brief case, portable desk, tool case, picnic basket or back pack. Different cases could be provided and interchanged with difference cases for different particularized storage functions.

5 Claims, 2 Drawing Sheets

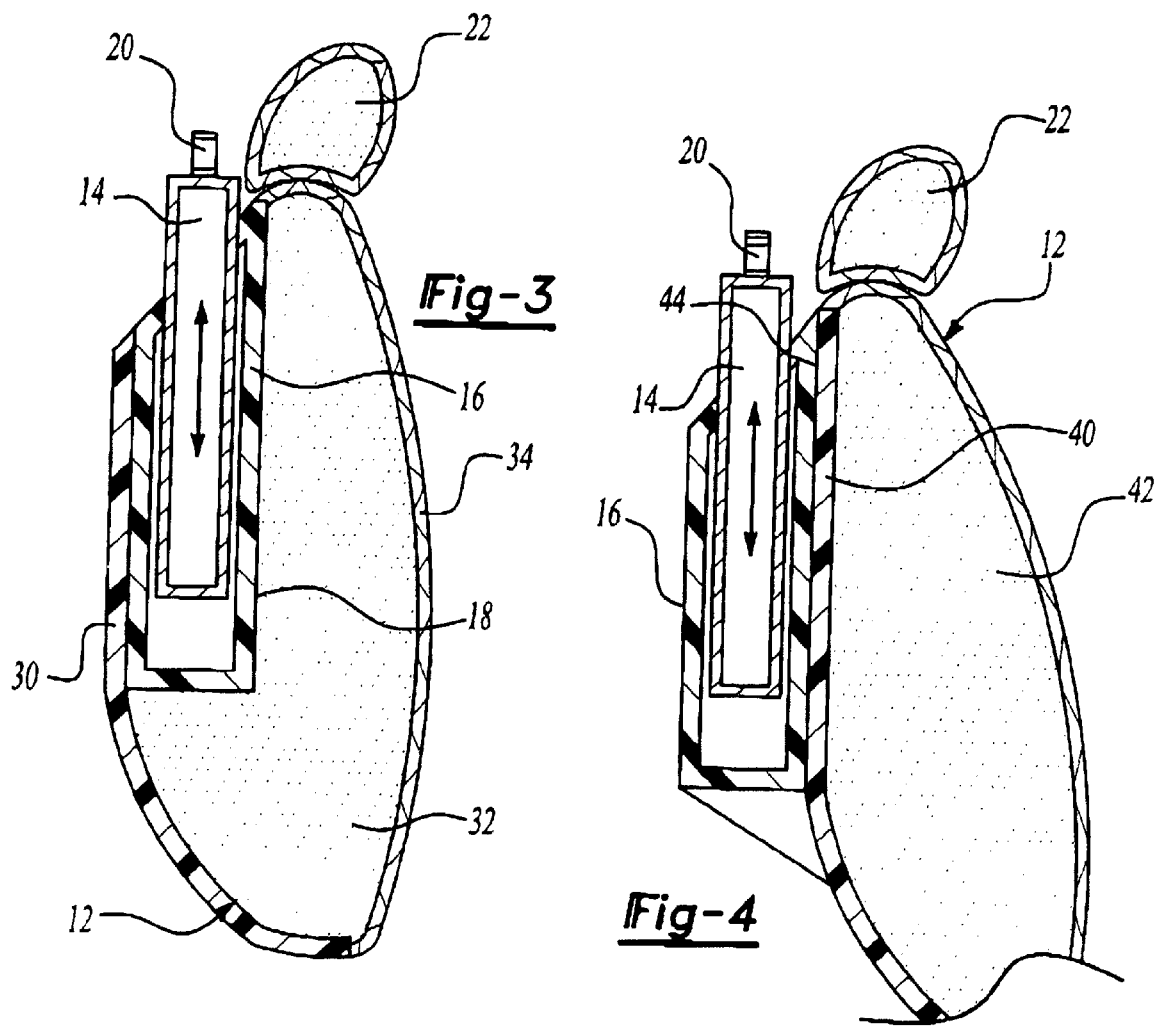
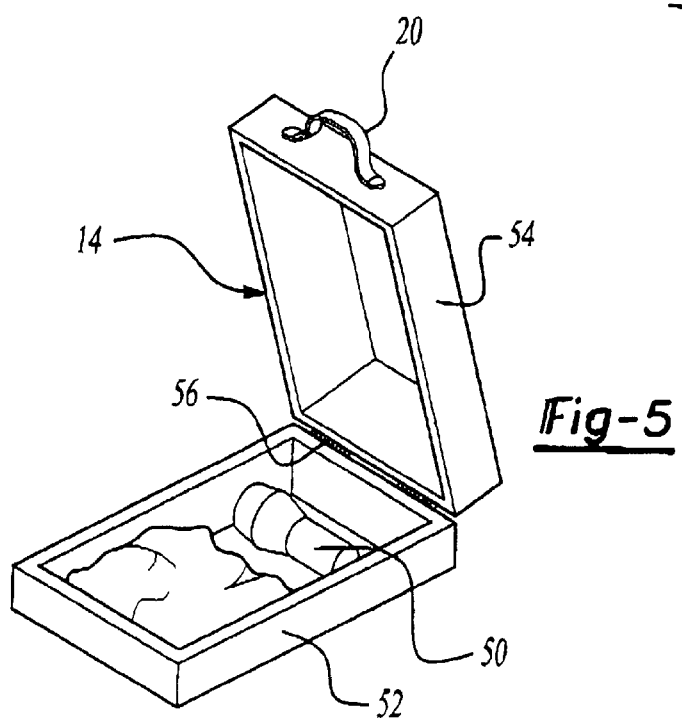

SEAT BACK HAVING POCKET FOR STORING A STORAGE CASE

CROSS-REFERENCE TO RELATED APPLICATIONS

This application claims the benefit of U.S. provisional application Ser. No. 60/121,991 filed Feb. 27, 1999.

TECHNICAL FIELD

The present invention relates to a storage case that is stored within a rigid pocket in conjunction with a vehicle seat.

BACKGROUND ART

Motor vehicle interiors are constantly being improved to provide convenient storage facilities. Generally, storage facilities may include storage devices such as elastic fabric pockets that are designed to temporarily receive articles. It may at times be necessary to transport in a vehicle personal items such as backpacks, picnic baskets, diaper bags or other articles that are not conveniently stowed in prior art elastic fabric pockets. When a vehicle is used for business, it may be necessary to transport a briefcase, tool chest or portable desk that are difficult to store in prior art pockets.

It may be desirable to transport a backpack, briefcase, picnic basket, diaper bag or the like that is packed with other smaller articles that would be inconvenient to unload for transportation. The prior art has failed to provide a system for storing a case for a particular item storage function such as a backpack, briefcase, picnic basket, diaper bag, tool chest or portable desk, in a vehicle. These and other problems are addressed by the present invention as summarized below.

DISCLOSURE OF INVENTION

According to the present invention, a modular seat back storage system is provided that allows a case to be received within a seat back of a vehicle seat. A rigid pocket may be formed within the seat back or attached to the seat back shell of the seat back. The rigid pocket is sized to receive similarly sized interchangeable specialized function storage cases.

According to the present invention, the case for a particularized storage function may be a backpack, briefcase, picnic basket, diaper bag, tool chest or portable desk.

These and other objects and features of the present invention will be better understood in view of the attached drawings and following detailed description.

BRIEF DESCRIPTION OF DRAWINGS

FIG. 3 is a cross-sectional view of one embodiment of the present invention taken along the line 3—3 in FIG. 1 wherein the pocket is located forward of the seat back shell.

FIG. 4 is a cross-sectional view of another embodiment of the present invention wherein the pocket is attached to a rearwardly facing surface of the seat back shell.

FIG. 5 is a perspective view of a storage case made in accordance with the present invention.

BEST MODE FOR CARRYING OUT THE INVENTION

Figure 1:
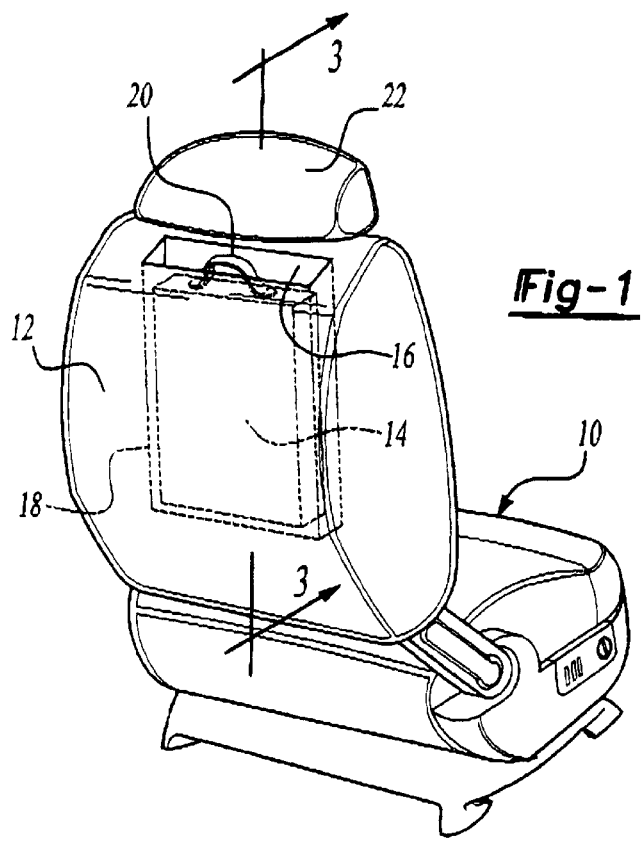
FIG. 1 is a rear perspective view of a vehicle seat having a storage case disposed in a pocket in a vehicle seat in accordance with the present invention.
Figure 2:
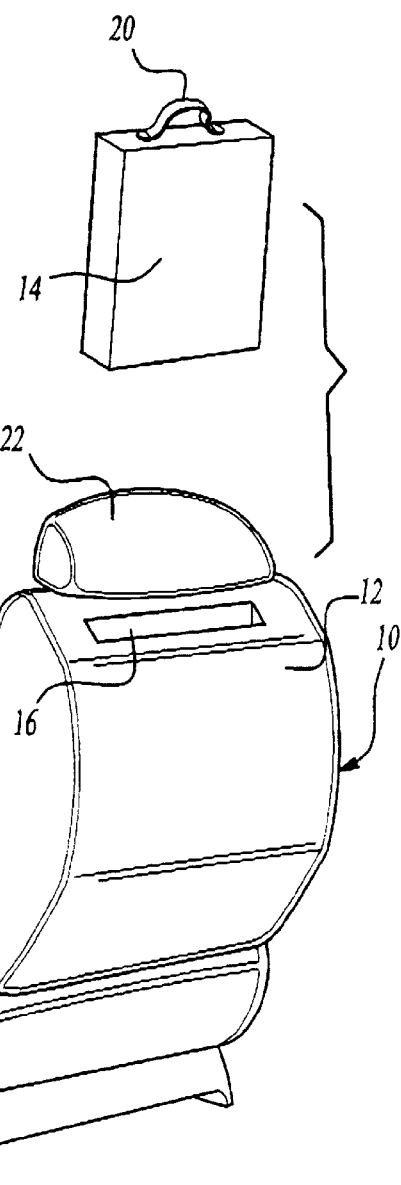
FIG. 2 is a rear exploded perspective view of the vehicle seat having a pocket for receiving a storage case with the storage case removed.

Referring now to FIG. 1 and FIG. 2, a vehicle seat is generally indicated by reference 10. Vehicle seat 10 includes a seat back 12 in which a case 14 is received. The case 14 is received in a rigid pocket 16. The rigid pocket 16 in the embodiment shown in FIG. 1 is received within a recess 18 formed in the seat back 12. A handle 20 is provided on the case 14 to assist in insertion and removal of the case 14 from the rigid pocket 16. A head rest 22 is shown on the top portion of the seat back 12 with the case 14 being accessible from the behind the head rest 22.

Referring now to FIG. 3, the embodiment shown in FIG. 1 is shown in cross-section wherein the seat back 12 receives case 14 having handle 20 for aiding in sliding the case 14 into and out of the rigid pocket 16. A recess 18 is defined between the seat back shell 30 and the foam bun 32 that form the major structural components of the seat back 12. An upholstered cover 34 of leather, vinyl or other fabric is provided to cover the foam bun 32 and may also cover the seat back shell 30, if desired. In the embodiment shown in FIG. 3, the rigid pocket 16 is secured to the seat back shell 30. The rigid pocket 16 must be sufficiently rigid to permit the seat to be used without affecting seat performance whether the case 14 is in the rigid pocket 16 or is removed from the rigid pocket 16.

Referring to FIG. 4, an alternative embodiment of the invention is shown. In the alternative embodiment, components of the seat back that are similar to those shown in the embodiment of FIG. 3 are referred by the same reference numerals. The seat back 12 includes a seat back shell 40 and a foam bun 42. The seat back shell 40 includes a rear facing surface 44 to which the rigid pocket 16 is secured. The rigid pocket 16 is designed to receive the case 14 that includes a handle 20. The case 14 is positioned behind the head rest 22.

Referring now to FIG. 5, an exemplary case 14 is shown with stored objects 50 contained therein. The case includes a base portion 52 and a lid portion 54 that are interconnected by means of a hinge 56.

The stored objects may include a wide variety of objects such as work materials or a portable computer facilitating using the case as a brief case; food items or utensils allowing the case to function as a picnic basket; diapers, bottles and other baby products allowing the case to function as a diaper bag; tools allowing the case to function as a tool chest. The case may also comprise a flexible back pack that can be used for hiking. The case could also be configured to include a writing surface and storage compartments for writing utensils and paper thereby providing a portable desk.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A modular seat back storage system comprising:

a vehicle seat having a seat back including a seat back shell and a seat bun, a recess being defined between the seat back shell and the seat bun;

a rigid pocket is received in the recess defined between the seat back shell and the seat bun;

a case for a particularized storage function is removably placed in the rigid pocket, said case having a handle on one end thereof that is accessible when the case is in the rigid pocket, said case being interchangeable with a different case for a different particularized storage function.

2. The modular seat back storage system of claim 1 wherein one of said cases is a brief case.

3. The modular seat back storage system of claim 1 wherein one of said cases is a picnic basket.

4. The modular seat back storage system of claim 1 wherein one of said cases is a diaper bag.

5. The modular seat back storage system of claim 1 wherein one of said cases is a tool chest.

* * * * *